(12) United States Patent
Seymour, II et al.

(10) Patent No.: US 7,029,035 B2
(45) Date of Patent: Apr. 18, 2006

(54) RELEASE COLLAR FOR COUPLING ASSEMBLY

(75) Inventors: Kenneth R. Seymour, II, Villa Park, IL (US); Daniel W. Jensen, Bensenville, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/659,849

(22) Filed: Sep. 11, 2003

(65) Prior Publication Data

US 2005/0057044 A1    Mar. 17, 2005

(51) Int. Cl.
*F16L 25/00*    (2006.01)
*F16L 37/00*    (2006.01)

(52) U.S. Cl. .......................... 285/308; 285/39; 285/93; 285/321

(58) Field of Classification Search .................. 285/39, 285/93, 308, 321

See application file for complete search history.

(56) References Cited

U.S. PATENT DOCUMENTS

| 5,553,895 | A |  | 9/1996 | Karl et al. |
| 5,570,910 | A |  | 11/1996 | Highlen |
| 5,934,709 | A | * | 8/1999 | Morrison ...................... 285/39 |
| 6,183,020 | B1 | * | 2/2001 | Luft ............................ 285/93 |
| 6,419,281 | B1 | * | 7/2002 | Salomon-Bahls et al. ... 285/307 |
| 6,450,545 | B1 | * | 9/2002 | LeMay et al. ................ 285/93 |
| 6,494,494 | B1 | * | 12/2002 | Vogel et al. .................. 285/39 |
| 6,588,805 | B1 | * | 7/2003 | Persohn et al. ............. 285/305 |
| 6,592,151 | B1 | * | 7/2003 | Densel et al. ................. 285/39 |
| 6,688,655 | B1 | * | 2/2004 | Watanabe .................... 285/321 |
| 6,769,720 | B1 | * | 8/2004 | Dahms et al. ............... 285/308 |
| 2004/0041394 | A1 | * | 3/2004 | Dahms et al. ................ 285/39 |
| 2004/0070197 | A1 | * | 4/2004 | Densel et al. ................. 285/39 |

* cited by examiner

*Primary Examiner*—James M. Hewitt
(74) *Attorney, Agent, or Firm*—Susan L. Lukasik; Dennis Kelly Sullivan; Jeffrey P. Calfa

(57) ABSTRACT

An apparatus for of reliably separating the male and female members of a coupling that may be used in high pressure conditions. A release collar (201) has an actuator (301), a release sleeve flange (303), and a ring (305). The actuator (301) is thinner than those utilized in known release sleeves, and may be advantageously located in closer proximity to the male member (101) than to the female member (103), such that the actuator may radially expand between the male and female members. The actuator (301) may be comprised of a cylindrical annulus and/or fingers disposed in a circular pattern. The ring (305) may have a lip (307) that allows the release collar (201) to remain with the female member (103).

28 Claims, 4 Drawing Sheets

FIG. 1
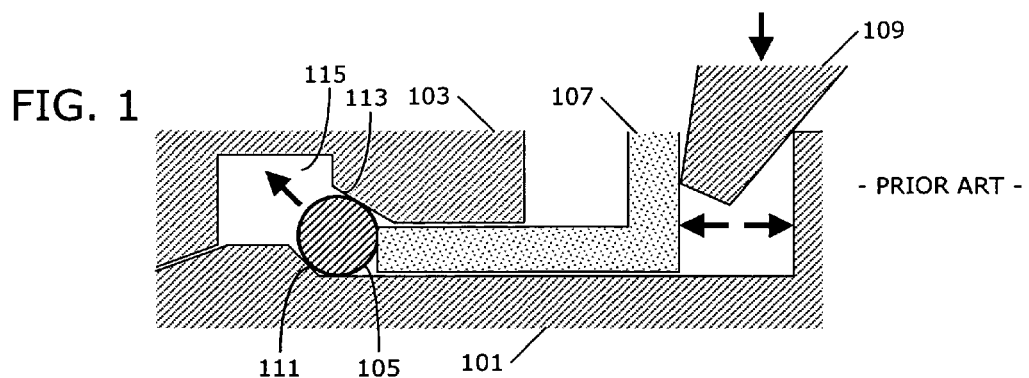
- PRIOR ART -
FIG. 2
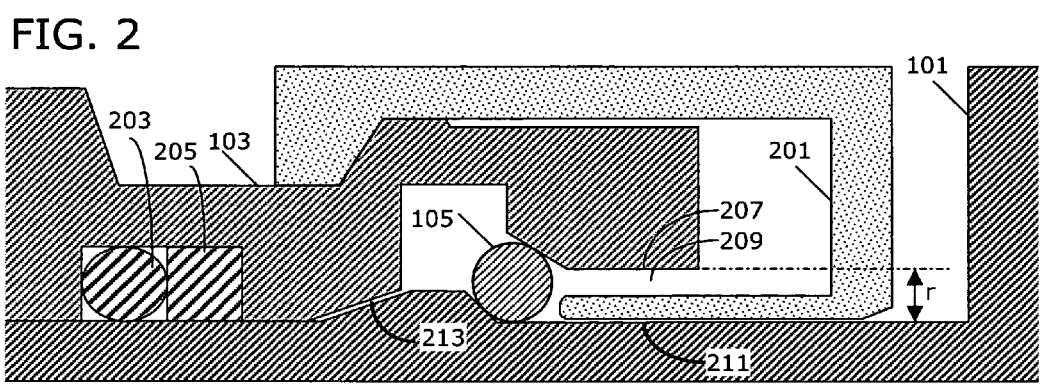
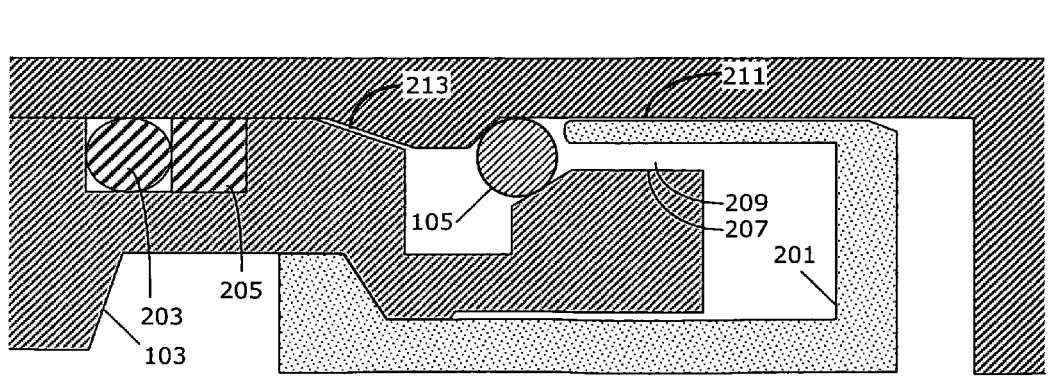

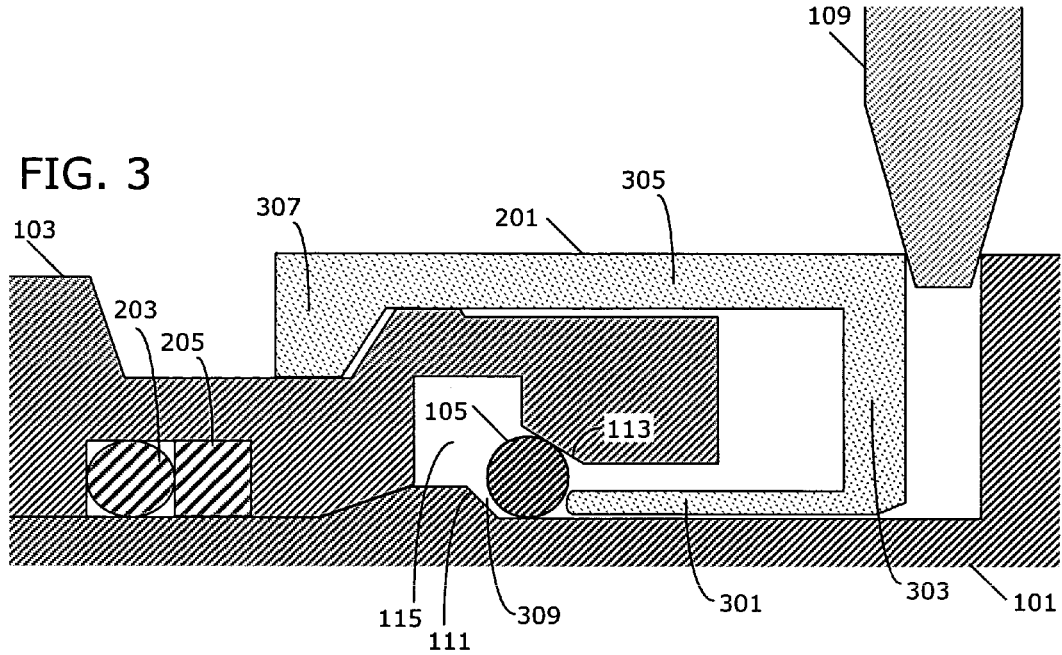
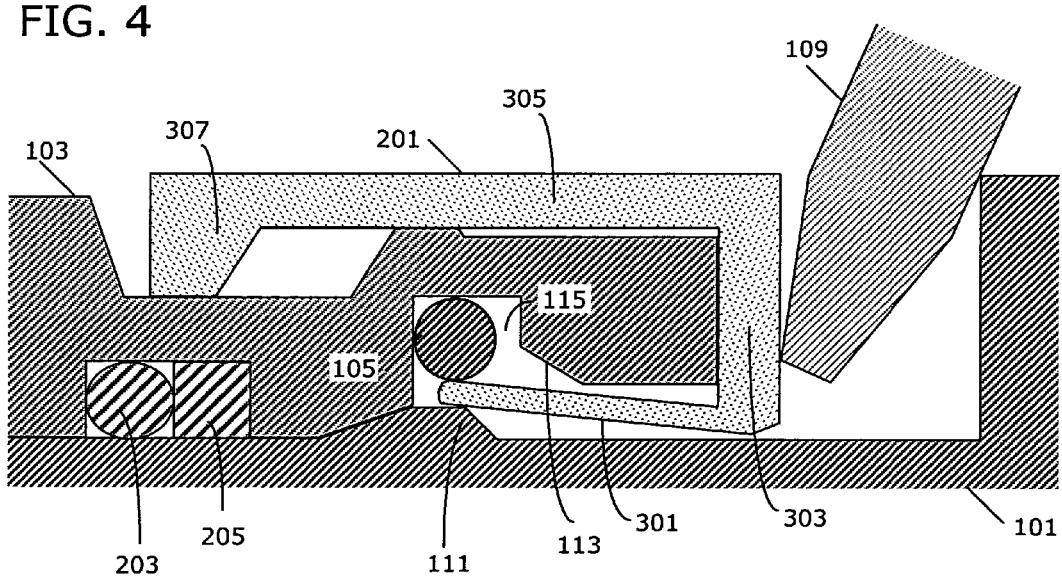

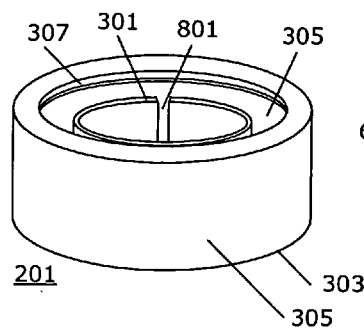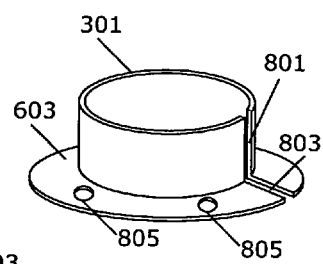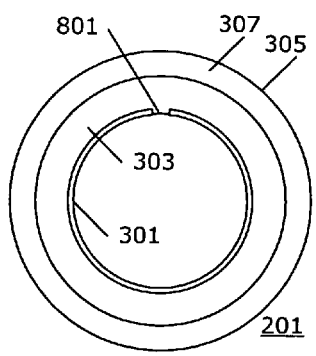
FIG. 8A       FIG. 8B       FIG. 8C
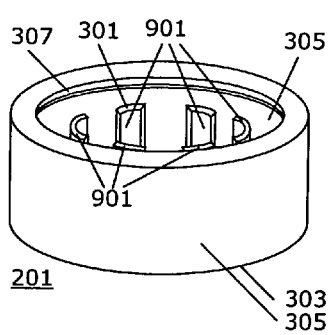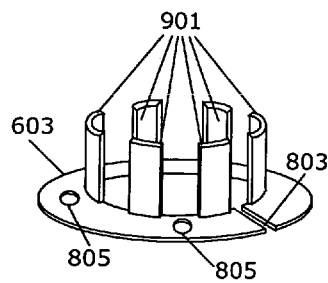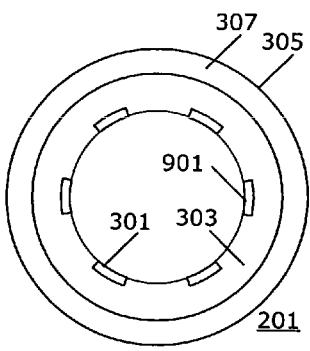
FIG. 9A       FIG. 9B       FIG. 9C
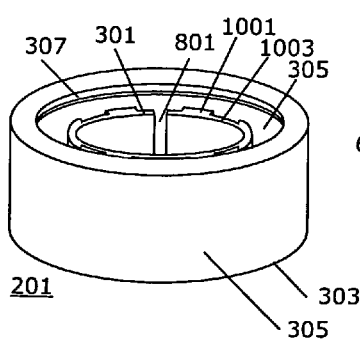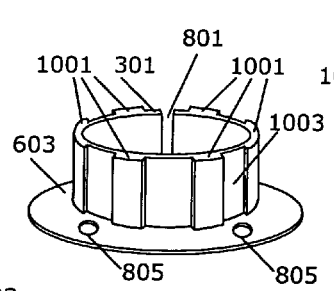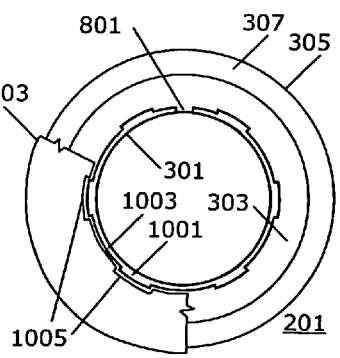
FIG. 10A       FIG. 10B       FIG. 10C

RELEASE COLLAR FOR COUPLING ASSEMBLY

FIELD OF THE INVENTION

This invention relates to coupling assemblies, including but not limited to coupling assemblies that permit fluid flow within while preventing leakage at high pressures.

BACKGROUND OF THE INVENTION

Many types of high-pressure couplings are known. One such type is described in U.S. Pat. No. 5,553,895, titled "Coupling Assembly" by Karl et al. A partial cross-section of the assembly is shown in FIG. 1, including a male member 101, a female member 103, a split locking ring 105, a release sleeve 107, and a release tool 109. During its locked condition, the locking ring 105 is trapped between a conical surface 111 of the male member 101 and a chamfer 113 of the female member 103, preventing the male member 101 from being separated from the female member 103. In order to separate the parts 101 and 103, the locking ring 105 must be dislodged into a chamber 115. By inserting the release tool 109 downward between the release sleeve 107 and a flange of the male member 101, force is imparted on the release sleeve 107 in a direction toward the locking ring 105, which moves up the conical surface and into the chamber 115, thereby allowing the male member 101 to be separated from the female member 103. When the coupling is separated, the locking ring 105 remains engaged within the female member 103 and the release sleeve 107 remains on the male member 101.

When the parts 101 and 103 do not separate after the desired vertical insertion of the tool 109, one tends to try to pry the tool 109 horizontally between the release sleeve 107 and the flange of the male member 101 by leveraging off the male member 101 to impart a horizontal force on the release sleeve 107. Unfortunately, such prying is likely to fail because the horizontal force pushes the sleeve 107 horizontally into the ring 105 that is against the conical surface 111, which is part of the male member 101. Lever action applied to the pry tool 109 is a force exerted on the release sleeve 107 in the correct direction as intended to release dislodge the ring 105, but an equal but opposite force is applied to the male member 101, causing the male member's conical surface 111 to move to the right, thereby wedging the ring between the conical surface 111 of the male member 101 and the chamfer 113 of the female member 103. Because there is not a sufficient opening between the conical surface 111 and the chamfer 113 when the ring 105 is wedged, the ring 105 is unable to be dislodged into the chamber 115. Such leverage action or prying does not help to release the ring 105.

Accordingly, there is a need for a more reliable way to separate the parts of such a coupling.

SUMMARY OF THE INVENTION

A release collar, utilizable with a coupling including a female member and a male member, includes a ring, an actuator, and a flange. The ring has a first axial end and a second axial end. The actuator includes a first axial end and a second axial end. The actuator is disposable between the male member and the female member. The actuator is in closer proximity to the male member than to the female member when the male member, the female member, and the release collar are engaged, such that the second axial end of the actuator is radially expandable within the actuator cavity. The flange operably engages the first axial end of the actuator and the first axial end of the ring.

BRIEF DESCRIPTION OF THE DRAWINGS

FIG. 1 is a radial cross-section of a locked coupling as known in the art.

FIG. 2 is a diametric cross-section of a locked coupling utilizing a release collar in accordance with the invention.

FIG. 3 is a radial cross-section of a locked coupling in conjunction with a release tool in accordance with the invention.

FIG. 4 is a radial cross-section of an unlocked coupling engaged with a release tool in accordance with the invention.

FIGS. 8, 9, and 10 illustrate various embodiments and views of a release collar in accordance with the invention.

DESCRIPTION OF A PREFERRED EMBODIMENT

Figure 5:
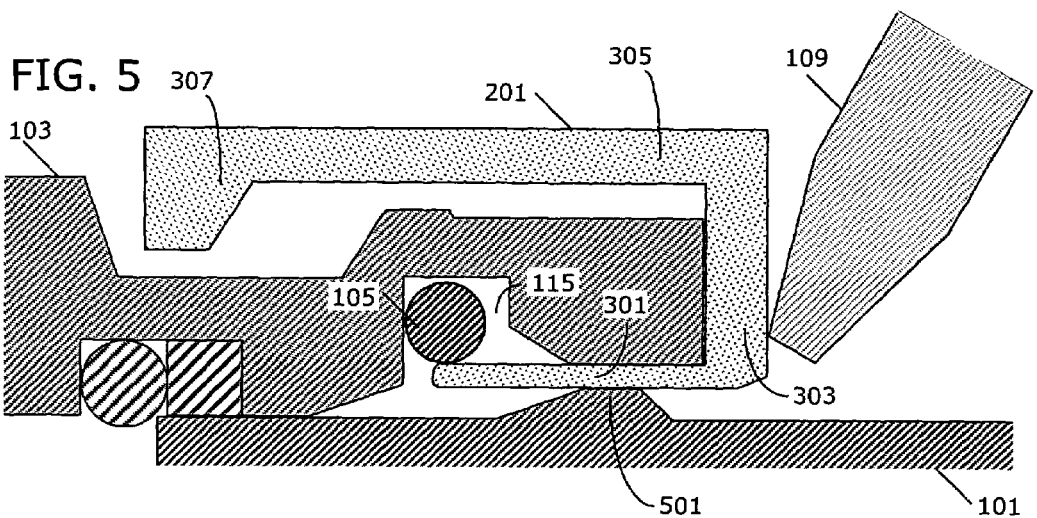
FIG. 5 is a radial cross-section of a male member disengaging from a female member of a coupling in accordance with the invention.

The following describes an apparatus for and method of reliably separating the male and female members of a coupling suitable, for example, for use in high pressure conditions, e.g., on the order of 5000 pounds per square inch. A release collar having an actuator, a flange, and a ring may be used to replace existing release sleeves without having to change or modify any other component of the coupling. The actuator described is thinner than those utilized in known release sleeves, and may be advantageously located in closer proximity to the male member than to the female member, such that the actuator may radially expand between the male and female members. The actuator may be comprised of a cylindrical annulus and/or fingers disposed in a circular pattern. The ring may have a lip that allows the release collar to remain with the female member. The release tool may be utilized to pry against the release collar to increase the likelihood of dislodging the locking ring.

A cross-section of part of a locked coupling utilizing a release collar 201 is shown in FIG. 2. The release collar 201 shown in FIG. 2 may be utilized with a male member 101 and female member 103 for a coupling, as well as its other components, such as the locking ring 105, annular seal 203, and rigid plastic ring 205. For example, the release collar 201 may replace the release sleeve that is shown and described in U.S. Pat. No. 5,553,895 issued to Karl et al., the entire contents of which patent are incorporated herein by reference. No modifications need be made to the male member 101, female member 103, locking ring 105, annular seal 203, and rigid plastic ring 205 in order to be compatible with the release collar 201, although variations in the release collar 201 may be needed to interconnect the release collar 201 to the rest of the coupling.

As shown in FIG. 2 and FIG. 3, the coupling is in its locked state, with the locking ring 105 trapped between the conical surface 111 of the male member and the chamfer 113 of the female member 103, such that the various components of the coupling are engaged. An inner release surface 207 of the female member 103 is a radial distance, r, from an outer release surface 211 of the male member 101, and an actuator cavity 209 is present between the inner release surface 207 and the outer release surface 211. When the inner release surface 207 and the outer release surface 211 are both cylindrical, the actuator cavity 209 is annular in shape. A gap 213 is typically present between the male member 101 and the female member 103 when the coupling is locked and pressurized fluid is present in the coupling.

A cross-section of part of a locked coupling in conjunction with a release tool 109 is shown in FIG. 3. When the coupling is ready to be unlocked, a gap 309 forms between the male member 101 and the locking ring 105 when the high pressure fluid is no longer present in the coupling. The release collar 201 is comprised basically of three members, an actuator 301, a release sleeve flange 303, and a ring 305. The actuator 301 is at least partially disposed in the actuator cavity 209. The actuator 301 is advantageously located in closer proximity to the male member 101, e.g., the outer release surface 211, than to the female member 103, e.g., the inner release surface 207. When the actuator 301 is located in closer proximity to the male member 101 than to the female member 103, the unattached end of the actuator 301 has the capability of radially expanding between the male member 101 and the female member 103. In addition, the actuator 301 is able to exert more force on the locking ring 105 than when the locking ring 105 is either centered in the actuator cavity 209 or located closer to the female member 103 because the actuator 301 has a better angle with respect to the locking ring 105.

The ring 305 may include a lip 307 at one axial end. The lip 307 extends radially inward, i.e., toward the center of the coupling where the male member 101 is disposed, such that the release collar 201 is retainable on the female member 103 in both the connected and separated conditions of the coupling. The lip 307 may also provide a seal between the release collar 201 and the female member 103. Although the lip 307 and ring 305 are shown to meet internally at a non-right angle in the figures, the lip 207 and ring 305 may meet at a right angle. The female member 103 may be similarly modified to have a right angle at the surfaces that mate with the lip 307 and ring 305. In U.S. Pat. No. 5,553,895, the release sleeve is retained on the male member. By retaining the release collar 201 on the female member 103, the release collar 201 may be pried with the release tool 109. The release collar 201 may alternatively be retained on the male member 101, although prying with the release tool 109 may not be successful.

The release sleeve flange 303, which is advantageously an annular disc, engages an axial end of the actuator 301 and an axial end of the ring 305. As shown in the figures, the actuator 301 is disposed near an inner diameter of the release sleeve flange 303 and the ring 305 is disposed near an outer diameter of the release sleeve flange 303. When the release tool engages the release sleeve flange 303, such as shown in FIG. 4, the actuator 301 is pushed into the locking ring 105, thereby dislodging it into the chamber 115 of the female member and unlocking the coupling. The actuator 301 may travel at least partially up the conical surface 111 of the male member 101, thus the actuator 301 is capable of flexing between the male member 101 and the female member 103. Once the locking ring 105 is in the chamber 115, the male member 101 and female member 103 may be separated, during which process the actuator 301 fits between the rib 501 of the male member 101 and the inner release surface 207 of the female member 103, as shown in FIG. 5.

Figure 6:
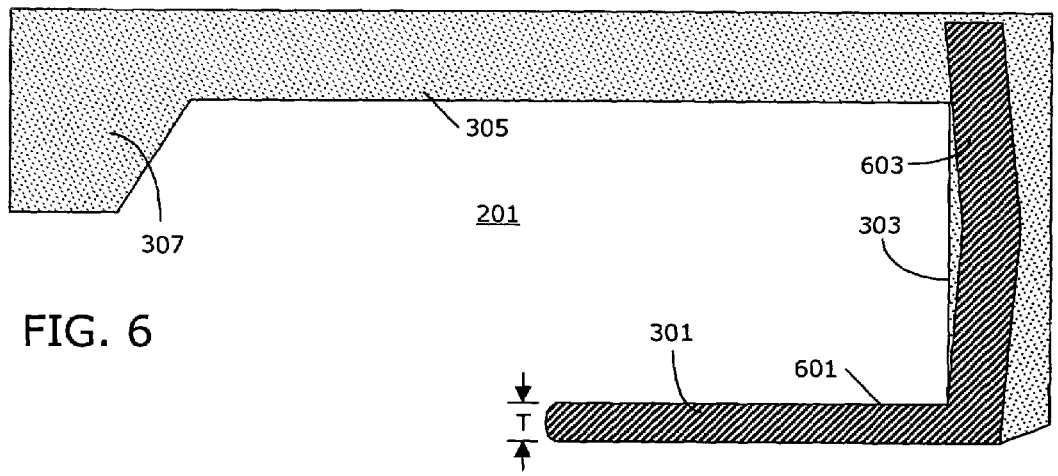
FIG. 6 is an example embodiment showing a radial cross-section of a release collar in accordance with the invention.

An example embodiment of a release collar 201 is shown in FIG. 6. The actuator 301/601 has a thickness, T, that is the radial thickness of the actuator 301/601. Advantageously, the thickness, T, is substantially less than the radial distance, r, between the inner release surface of the female member 103 and the outer release surface of the male member 101. The thickness and tolerances of the actuator 301/601 are appropriately chosen to allow the actuator 301/501 to fit between the rib 501 of the male member 101 and the inner release surface 207 of the female member 103, so that the male member 101 may be withdrawn from the female member 103.

The actuator 601 may extend at least partially into the release sleeve flange 303, resulting in an actuator flange 603. The actuator flange 603 may extend throughout the release sleeve flange 303 radially or partially into the release sleeve flange 303 radially and/or axially. The actuator flange 603 and/or release sleeve flange 303 may be shaped such that a seal between the release collar 201 and the male member 101 results near the inner diameter of the release sleeve flange 303. Alternatively, a material such as rubber may be added to the internal and/or external faces of the release collar to protect against dirt and debris. The actuator flange 603 may include one or more bends and/or one or more apertures of various natures.

The release collar 201 may be comprised of multiple different materials. For example, the actuator 301, including, if utilized, its actuator flange 603, may be comprised of a metal, such as spring steel, and the release sleeve flange 303 and ring 305 may be comprised of plastic and/or elastomeric materials and are formed around and/or in addition to the actuator flange 603. The release collar 201 may be made with materials, shapes, and methods similar to those utilized to build the release sleeve as described in U.S. Pat. No. 5,553,895 patent, but with changes as described herein, for example, the thickness of the actuator 301, its location in the actuator cavity 209, and/or the use of a lip 307 or other feature to retain the release collar 201 on the female member 103. As shown in FIG. 6, the plastic and/or elastomeric materials may cover one entire surface of the release sleeve flange 303, and may cover part or all of the other surface of the release sleeve flange 303. For the sake of simplicity, the release collar 201 is not shown in FIG. 2 through FIG. 5 with the detail shown in FIG. 6.

Figure 7:
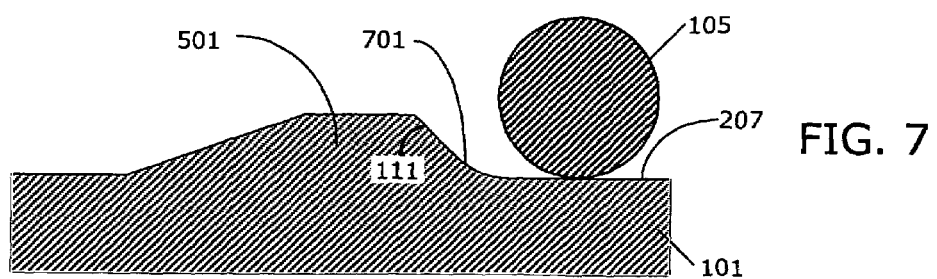
FIG. 7 is a radial cross-section of an alternate embodiment of a section of a male member of a coupling in accordance with the invention.

A partial cross-section of an alternate embodiment of a section of a male member of a coupling is shown in FIG. 7. A curved surface 701 may optionally be provided between the outer release surface 207 and the conical surface 111 of the male member 101. The curved surface 701 provides the advantage of facilitating movement of the actuator onto the conical surface 111. The angle of curvature of the curved surface 701 is advantageously the same as the angle of curvature of the locking ring 105.

A first embodiment of a release collar 201 is shown in FIG. 8A, FIG. 8B, and FIG. 8C. The actuator 301 is comprised of a cylindrical annulus, with one or more axial apertures 801 disposed therein. The axial apertures 801 provide the actuator 301 with the ability to expand radially outward as needed. The axial apertures 801 provide strain relief and flexibility in the actuator 301, especially as the actuator 301 expands. Although one axial aperture 801 is shown in the figures, two or more axial apertures 801 may be utilized. Multiple apertures 801 are advantageously evenly spaced angularly around the actuator 301. The optional actuator flange 603 may include one or more apertures 803 or 805 of various natures. One or more radial apertures 803 may be utilized to facilitate expansion of the actuator flange 603 and actuator 301. The radial apertures 803 may align with the axial apertures 801 of the actuator 301. More radial apertures 803 may be present than axial apertures 801, more axial apertures 801 may be present than radial apertures 803, or an equal number of radial apertures 803 and axial apertures 801 may be present. One or more angularly-distributed apertures or through-holes 805 may be provided in the actuator flange 603 in order to assist in any molding process, for example, when a plastic or elastomeric material forms the ring 305 and part of the release sleeve flange 303, the material passes through the apertures 805 to provide secure attachment to the actuator 301 and/or actuator flange 603.

A second embodiment of a release collar 201 is shown in FIG. 9A, FIG. 9B, and FIG. 9C. The actuator 301 is comprised of a plurality of fingers 901. The fingers 901 are advantageously evenly sized and spaced and are disposed in a circular pattern that encircles the outer release surface 211 of the male member 101. The fingers 901 may alternatively be unevenly spaced and/or unevenly sized, and may not be disposed in a circular pattern. The fingers 901 expand radially outward as needed, and the female member 103 may include slots to accommodate the movement of the fingers 901, such as shown in FIG. 10C. The optional actuator flange 603 may include one or more apertures 803 or 805 of various natures. One or more radial apertures 803 may be utilized to facilitate expansion of the actuator flange 603 and actuator 301. The radial apertures 803 may align with the spaces between the fingers 901 of the actuator 301. More radial apertures 803 may be present than fingers 901, and vice versa. One or more angularly-distributed apertures or through-holes 805 may be provided in the actuator flange 603 in order to assist in any molding process, for example, when a plastic or elastomeric material forms the ring 305 and part of the release sleeve flange 303, the material passes through the apertures 805 to provide secure attachment to the actuator 301 and/or actuator flange 603.

A third embodiment of a release collar 201 is shown in FIG. 10A, FIG. 10B, and FIG. 10C. The actuator 301 is comprised of a plurality of fingers 1001 as well as a cylindrical annulus 1003. The fingers 1001 are advantageously evenly sized and spaced and are disposed in a circular pattern that encircles the outer release surface 211 of the male member 101. The fingers 1001 may alternatively be unevenly spaced and/or unevenly sized, and may not be disposed in a circular pattern. The cylindrical annulus 1003 holds the fingers 1001 together and keeps them substantially parallel. Although the fingers 1001 and cylindrical annulus 1003 are sized such that they slidably fit between the male member 101 and the female member 103, the cylindrical annulus 1003 may have a very small thickness, such as 10% to 20% of the radial distance.

One or more axial apertures 801 may be disposed in the cylindrical annulus 1003 to provide the actuator 301 with the ability to expand radially outward as needed. Although one axial aperture 801 is shown in the figures, two or more axial apertures 801 may be utilized. Multiple apertures 801 are advantageously evenly spaced angularly around the actuator 301. The fingers 1001 and annulus 1003 expand radially outward as needed, and the female member 103 may include slots 1005 to receive and/or accommodate the movement of the fingers 1001, such as shown in FIG. 10C. The optional actuator flange 603 may include one or more apertures 803 or 805 of various natures. One or more radial apertures 803 may be utilized to facilitate expansion of the actuator flange 603 and actuator 301. The radial apertures 803 may align with the spaces between the fingers 901 of the actuator 301. More radial apertures 803 may be present than fingers 901, and vice versa. One or more angularly-distributed apertures or through-holes 805 may be provided in the actuator flange 603 in order to assist in any molding process, for example, when a plastic or elastomeric material forms the ring 305 and part of the release sleeve flange 303, the material passes through the apertures 805 to provide secure attachment to the actuator 301 and/or actuator flange 603.

The present invention provides a release collar that more reliably dislodges the locking ring from between the male and female members of a coupling. The release collar may be utilized to pry against the actuator in the present invention, whereas prior couplings such as in U.S. Pat. No. 5,553,895 do not provide for prying. The release collar of the present invention more consistently results in disengaging the male and female members on the first attempt. The release collar may be used to replace existing release sleeves without having to modify any other component of the coupling. Although the release collar may be utilized without change to the male or female members, advantage is obtainable by modification of the male and/or female members for use with the release collar as described in various embodiments herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A release collar utilizable with a coupling including a female member and a male member, the release collar comprising:
   a ring comprising a first axial end and a second axial end;
   an actuator comprising a first axial end and a second axial end, wherein the actuator is disposable between a radially outermost surface of a rib of the male member and the female member while the male member is withdrawn from the female member, and wherein the actuator is in closer proximity to the male member than to the female member when the male member, the female member, and the release collar are engaged, such that the second axial end of the actuator is radially expandable within an actuator cavity;
   a flange operably engaging the first axial end of the actuator and the first axial end of the ring;
   wherein the release collar is disposed on the female member when the male member and the female member are not engaged.

2. The release collar of claim 1, wherein the actuator is engagable with a locking ring disposed between the male member and the female member, such that when force is applied to the flange, the actuator is capable of dislodging the locking ring into a chamber within the female member when inserted between the locking ring and the radially outermost surface of the rib.

3. The release collar of claim 1, wherein the actuator has a thickness that is substantially less than a radial distance between an inner release surface of the female member and an outer release surface of the male member.

4. The release collar of claim 1, wherein the first axial end of the actuator is disposed near a first diameter of the flange, and wherein the first axial end of the ring is disposed near a second diameter of the flange.

5. The release collar of claim 1, wherein a lip is disposed at the second axial end of the ring, and wherein the lip extends radially inward such that the release collar is retainable on the female member.

6. The release collar of claim 5, wherein the lip provides a seal between the release collar and the female member.

7. The release collar of claim 1, wherein the actuator comprises a cylinder having at least one axial aperture.

8. The release collar of claim 1, wherein the actuator comprises a plurality of fingers.

9. The release collar of claim 1, wherein the actuator is capable of radially flexing.

10. A coupling comprising the release collar of claim 1, and further comprising a female member including at least one slot arranged and constructed to receive at least one finger of the actuator.

11. A release collar utilizable with a coupling including a female member, a male member, and an actuator cavity, the release collar comprising:
a flange comprising a first diameter and a second diameter;
an actuator comprising a first axial end, a second axial end, and a thickness, wherein the first axial end of the actuator is disposed near the first diameter of the flange, and wherein the actuator is radially expandable between a rib of the male member and the female member such that the rib of the male member is withdrawn along the actuator while the male member is withdrawn from the female member;
a ring comprising a first axial end and a second axial end, wherein the first axial end of the ring is disposed near the second diameter of the flange;
wherein the release collar is disposed on the female member when the male member and the female member are not engaged.

12. The release collar of claim 11, wherein a lip is disposed at the second axial end of the ring, and wherein the lip extends radially inward such that the release collar is retainable on the female member.

13. The release collar of claim 12, wherein the lip provides a seal between the release collar and the female member.

14. The release collar of claim 11, wherein the flange provides a seal between the release collar and the male member.

15. The release collar of claim 11, wherein the actuator cavity has a radial distance that is present between an inner release surface of the female member and an outer release surface of the male member, and wherein the actuator is in closer proximity to the outer release surface of the male member than to the inner release surface of the female member when the male member, the female member, and the release collar are engaged.

16. The release collar of claim 11, wherein the actuator comprises at least one of a cylinder having at least one axial aperture and a plurality of fingers.

17. The release collar of claim 11, wherein the actuator is in closer proximity to the male member than to the female member when the male member, the female member, and the release collar are engaged, such that the second axial end of the actuator is radially expandable within the actuator cavity.

18. The release collar of claim 11, wherein the actuator is capable of radially flexing.

19. A coupling comprising the release collar of claim 11, wherein the female member includes at least one slot arranged and constructed to receive at least one finger of the actuator.

20. The release collar of claim 11, wherein the actuator is engagable with a locking ring disposed between the male member and the female member, such that when force is applied to the flange, the actuator is capable of dislodging the locking ring into a chamber within the female member.

21. A release collar utilizable with a coupling including a female member, a male member, and an actuator cavity having a radial distance between an inner release surface of the female member and an outer release surface of the male member, the release collar comprising:
an annular flange comprising an inner diameter and an outer diameter;
an actuator comprising a first axial end, a second axial end, an inner diameter, an outer diameter, and a thickness, wherein the first axial end of the actuator is disposed near the inner diameter of the annular flange, wherein the thickness of the actuator is substantially less than the radial distance, wherein the actuator is disposable between the male member and the female member, and wherein the actuator is in closer proximity to the outer release surface of the male member than to the inner release surface of the female member when the male member, the female member, and the release collar are engaged, such that the second axial end of the actuator is radially expandable within the actuator cavity;
a ring comprising a first axial end, and a second axial end, wherein the first axial end of the ring is disposed near the outer diameter of the annular flange, and wherein the second axial end comprises a lip that extends radially inward such that the release collar is retained on the female member when the male member and the female member are not engaged.

22. The release collar of claim 21, wherein the actuator comprises a first material, wherein the ring comprises a second material, wherein the annular flange comprises the first material and the second material, and wherein the second material covers most of the outer surface of the annular flange and at least part of the inner surface of the annular flange.

23. The release collar of claim 21, wherein the lip provides a seal between the release collar and the female member, and wherein the inner diameter of the annular flange provides a seal between the release collar and the male member.

24. The release collar of claim 21, wherein the actuator comprises a cylinder having at least one axial aperture.

25. The release collar of claim 21, wherein the actuator comprises a plurality of fingers.

26. The release collar of claim 21, wherein the actuator is engagable with a locking ring disposed between the male member and the female member, such that when force is applied to the flange, the actuator is capable of dislodging the locking ring into a chamber within the female member when inserted between the locking ring and a radially outermost surface of a rib of the male member.

27. The release collar of claim 21, wherein the actuator fits between a rib of the male member and the inner release surface of the female member so that the male member may be withdrawn from the female member.

28. A coupling comprising the release collar of claim 21, wherein the female member includes at least one slot arranged and constructed to receive at least one finger of the actuator.

* * * * *